March 10, 1964  E. B. CARPENTER  3,124,104
FEED TROUGH CONTROL MECHANISM
Filed June 11, 1962
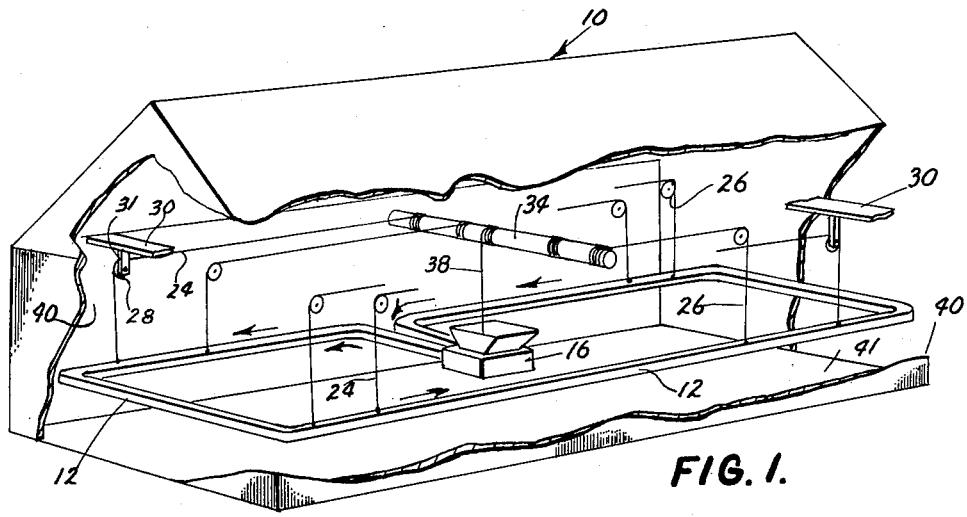
FIG. 1.
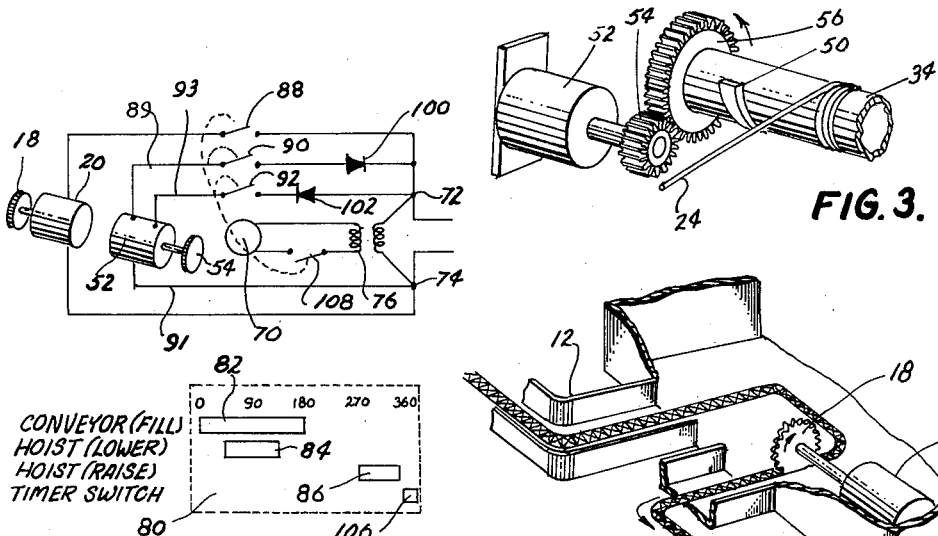
FIG. 3.
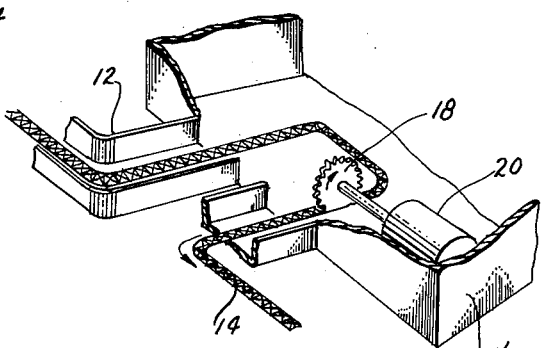
FIG. 4.
FIG. 2.
INVENTOR.
ELMER B. CARPENTER
BY
ATTORNEYS

United States Patent Office 3,124,104
Patented Mar. 10, 1964

3,124,104
FEED TROUGH CONTROL MECHANISM
Elmer B. Carpenter, Springdale, Ark., assignor to Automatic Poultry Feeder Company, Zeeland, Mich., a corporation of Michigan
Filed June 11, 1962, Ser. No. 201,543
4 Claims. (Cl. 119—51.12)

This invention relates to an animal feeding method and apparatus, and more particularly to automatic feeding apparatus enabling complete control of time and conditions of access to the feed.

Poultry and animal husbandry in general today requires automation to be competitive. As an example, poultry farmers possess giant poultry houses with automatic egg gathering, watering, and feeding. Feeding conveyors have been a boon to poultry farmers, but still have limitations with respect to some types of feeding techniques. One important limitation occurs, for example, where so-called "limited feeding" techniques are practiced. These techniques are used in poultry husbandary on young fowl to obtain large bone structure and bodies without excessive fat. Since the amount of feed is limited, the use of a conveyor for transporting feed into the poultry house has not been successful heretofore, because great damage occurs to the flock when hundreds and often thousands of fowl crowd up around the entrance of the feed conveyor as the feed begins to appear. Poultry crowd together so forcefully that many are injured and killed. Not only is there a problem at the beginning of limited feeding, but it has also not been possible as far as is known, to stop the feeding at a predetermined time without harm to the animal or fowl. For example, if a cover is attempted to be forcefully placed on the feed trough after a predetermined time, fowl such as poultry simply will not withdraw their heads from the trough and thereby are injured by the cover.

It is an object of this invention to provide an automatic feeding apparatus enabling complete control of access of the animals to the feeding trough. The invention enables control of access from the standpoints of time, quantity of feeding, and conditions under which feeding is allowed.

It is another object of this invention to provide feeding apparatus providing feed simultaneously for all the animals in a uniformly distributed manner, and completely removing the cause of animal crowding and injury. It permits automatic feeding even when using limited feeding techniques, without danger to the fowl or animals. It enables feeding to be started, and to be stopped, at a precise time. It enables the feed to be uniformly distributed in the trough before any of the fowl have access to it, thereby controlling the conditions under which the fowl have access.

These and other objects of this invention will be apparent upon studying the following specification in conjunction with the drawings, in which:

FIG. 1 is a cut-away, perspective view of an animal barn or poultry house, showing the novel automatic feed control apparatus;

FIG. 2 is a fragmentary, perspective, enlarged cutaway view of the feed hopper and part of the feed trough and conveyor means in the apparatus illustrated in FIG. 1;

FIG. 3 is a fragmentary, perspective, enlarged view of the elongated hoisting cable-drum illustrated as part of the invention in FIG. 1; and FIG. 4 is a circuit diagram and a representative electrical control mechanism for the apparatus.

Basically, the inventive feeding apparatus comprises a feed trough and hopper, a conveyor for filling the trough from the hopper and distributing feed in the trough, and hoist means for lowering and lifting the trough into and out of reach of the feeding animals or fowl. The conveyor is operated by a motor means, and the hoist means is operated by a motor means. The hoist is preferably formed of a plurality of cables suspending the trough, and the hopper if desired, and being simultaneously windable or unwindable on drum means. Electrical control means causes the conveyor to be activated to fill the trough before the hoist is activated. After the feed is uniformly distributed in the trough, the hoist is adapted to lower the trough to thereby achieve simultaneous feeding without crowding. After a predetermined time, the hoist is activated in a reverse direction to lift the feed trough out of reach again.

Referring to the drawings, in the form of the invention shown, the enclosure 10 may comprise an animal barn or a house for fowl such as poultry. Within the house is fed trough means 12 through which a suitable conveying means such as chain 14 (FIG. 2) or its equivalent moves to transport feed from a suitable hopper 16 in a closed circuit route around the poultry house, or a portion thereof. A suitable chain for this is shown, for example, in the patent to Smallegan No. 2,737,823. The chain 14 may be driven from a suitable sprocket 18 by an electrical motor 20 so that the chain continually passes beneath the feed in hopper means 16 to load up and keep the trough 12 constantly filled with uniformly distributed feed.

In the form of the invention shown, one end of the trough is suspended by a first plurality of cables 24, and a second end by a second plurality of cables 26. Cables 24 may pass over suitable pulleys or sheaves 28 suspended by straps 31 from cross beams 30 in the poultry house. Cables 24 can be wound in a clockwise fashion around the centrally positioned cable drum 34. Cables 26 on the opposite end of the feed trough likewise pass over suitable sheaves and wind in a clockwise direction by passing under the drum 34 and around. Alternatively, the cables may be wound all in a counter-clockwise direction if desired. The hopper 16 may be hoistably suspended by a cable 38 likewise wound in a clockwise fashion around the drum 34. Drum 34 is rotatably mounted between side walls 40 of the building, or if desired upon vertical upright supports extending upwardly from the floor, or upon suspended hangers from above. The drum is provided with suitable bearing means 50 (FIG. 3).

Rotatable drive means is provided on the drum to rotate it in a clockwise fashion to wind up the cables, or in a counterclockwise fashion to unwind the cables simultaneously and uniformly. The preferred drive means includes a powered motor means such as electrical motor 52 which may be mounted to the wall of the house, or on any other suitable stand. In the form of the invention shown, motor 52 drives a spur gear 54 which in turn drives gear 56 mounted to the drum 34. Motor 52 is preferably a reversible electric motor to enable rotation of the drum in either direction. Obviously, a suitable gear box may be placed between the gears 54 and 56 to provide a reversible action. For example, a gear box having a shifting spur gear operated by a solenoid may be utilized to reverse the direction of the drive. However, it is preferable to simply have a reversible electric motor 52 since this enables simplified electrical control means. It will be obvious that rotation of gears 54 and 56, and of drum 34 in one direction or in the other unwinds or winds the cables 24 and 26 thereon.

It is preferable to utilize a centrally mounted drum 34, since the lateral forces imparted by the cables 24 and 26 balance each other, so that the resultant lateral and vertical force is substantially nil. The only vertical stress imparted to the drum is therefore caused by the centrally positioned hopper 16. It is conceivable that the hopper could also be located in a displaced fashion with a counterweight opposite to it to balance the forces on the drum 34. Also, it is conceivable that the hopper can be fixedly mounted so as not to be hoisted or lowered with the feed trough means, but rather include a flexible connection so that feed can be conveyed from the hopper to the feed trough means when the trough is raised or lowered.

The electrical control means for the apparatus to drive the electrical motors 20 and 52 is illustrated in FIG. 4. It includes a timer motor 70 actuated by A.C. power across leads 72 and 74, through step down transformer 76. Timer motor 70 drives a switch drum 80 (shown expanded) having camming means 82, 84 and 86 thereon to control switches 88, 90 and 92, respectively. Conveyor motor 20 is connected across leads 72 and 74 through switch 88. Reversible D.C. hoist motor 52 is connected across leads 72 and 74 through lines 89 and 91, switch 90 and rectifier 100. Its reversible connection is through the parallel circuit including lines 91 and 93, switch 92, and rectifier 102.

*Operation*

In utilizing the novel feeding apparatus, in order to prevent animals from crowding to the section of the conveyor immediately adjacent the hopper as feed begins to emerge, the feed trough is first filled with feed distributed substantially over the length thereof before the fowl or other animals have excess to the trough. Thus, as power is supplied across leads 72 and 74, timer motor 70 begins to slowly revolve to rotate drum 80. The drum is adapted to rotate once for a complete feeding cycle. Cam 82 first actuates switch 88 to close it and thereby connect A.C. motor 20 across leads 72 and 74. This causes the conveyor mechanism, including a chain or equivalent means 14, to pass underneath the feed in hopper 16 and transport it throughout the length of the trough 12. This filling operation continues for a substantial period of time shown for example by its continued operation during 180° rotation of the drum. Meanwhile, after the drum has rotated about 45°, cam 84 closes switch 90 to cause current to flow from lead 72, through rectifier 100, to switch 90 in line 89, through motor 52, through line 91 and back to lead 74 to actuate motor 52 in one direction. This causes rotation of spur gear 54 and meshing gear 56 mounted to the drum 34. Rotation of the drum 34 in a counter-clockwise direction causes cables 24 and 26 to unwind therefrom and pass over their respective pulleys to lower the trough into the reach of animals standing on floor 41 of the house 10. Since the feed has by this time been distributed throughout the length of the trough 12, all of the animals simultaneously have access to it, thereby removing any need for crowding. Motor 52 continues to operate until the feed trough is at the proper height. This is shown arbitrarily on drum 80 by operation until the drum moves from 45° to 135°. Obviously, the length of time during which motor 52 will operate will vary upon the height of the house, the height to which the trough is raised, the optimum lowered height of the trough for feeding access for the particular animals or fowl involved, and many other factors. Likewise, the time at which the hoist begins to be lowered will vary, depending upon the size of the trough, the length of the trough, the speed of the conveyor, and other factors controlling the filling or distributing time of the conveyor. After the conveyor means has been lowered allowing access to the feed by the animals or fowl, preferably the conveyor motor 20 continues to operate as shown by the continued operation between 135° and 180° rotative movement of drum 80. Again, this will vary depending upon the circumstances. When drum 80 rotates between 180° and 270°, cam 82 allows switch 88 to remain open and stop the conveyor. This allows the animals to eat up the remainder of the feed in the trough, or a portion thereof. When the drum reaches 270°, cam 86 closes switch 92 to cause current to flow in the reverse direction through motor 52, i.e. from lead 74, through line 91, through motor 52, through line 93 including switch 92 and rectifier 102, to lead 72. This causes the motor 52 to operate in the opposite direction to rotate spur gear 54 in a counter-clockwise direction, and rotate gear 56 and drum 30 in a clockwise direction to wind up the respective cables 24, 26 and 38. This continues until about 330° rotation of the drum in the example shown, at which time switch 92 opens to stop motor 52. When the drum makes a complete revolution, i.e. a 360° cycle, cam 106 opens control switch 108 to the timer motor 70 until it is manually closed at the next feeding time.

It will be obvious to those in the art that the amount of time which lapses between each of these steps in the cycle as well as factors determining whether certain steps should overlap other steps will depend greatly upon the type of animals to be fed, the size of the flock or herd, the amount of feed to be fed, etc. However, it is important that the conveyor begin a substantial period of time before activation of the hoist lowering mechanism, so that the conveyor will have feed substantially throughout its length before the hoist enables the trough to be placed in an access position. Also, the hoist mechanism should preferably raise the feed trough means after a specific and limited period of feeding time.

Certain modifications can be made in the mechanism of the apparatus or the circuitry within the principles of the invention as taught, depending upon the circumstances. These obvious modifications are deemed part of this invention which is to be limited only by the scope of the appended claims and the reasonably equivalent structures thereto, rather than by the illustrative form of the invention described.

I claim:

1. A method of providing controlled feeding of animals from a trough having feed conveying means comprising the steps of: providing a feed trough having feed conveying means therein; operating said feed conveying means to fill said trough while simultaneously maintaining said trough in a hoisted position out of reach of said animals; lowering said trough into the reach of said animals to allow access thereto; continuing to operate said conveying means to fill said trough for a set period of time; and hoisting said trough out of reach of said animals after said period of time.

2. An animal feeding apparatus comprising: feed trough means; feed hopper means associated with said trough means; conveyor means for said trough means adapted to transport feed from said hopper means to said trough means and distribute the feed in said trough means; power motor means for operating said conveyor means; hoist means for raising and lowering said trough means out of the reach of and into the reach of feeding animals; power motor means operatively associated with said hoist means, electrical timer and switching means including control means to start operation of said conveyor power motor means while said trough is in a raised position and before said hoist power motor means is actuated to lower said trough means, control means to operate said hoist power motor means to lower said feed trough on a timed basis, and control means to operate said hoist power motor means in a reverse movement to raise said feed trough after a predetermined time interval, whereby said feed trough means can be normally kept out of reach of said animals and can be filled before said trough is lowered into the reach of said feeding animals.

3. An animal feeding apparatus comprising: feed trough means; feed hopper means associated with said trough means; powered conveyor means for said trough means adapted to transport feed from said hopper means to said trough means and distribute the feed in said trough means; a plurality of cables attached to and suspending said feed trough means and said feed hopper means; cable drum means adapted to be rotated and simultaneously wind and unwind said plurality of cables to raise and lower both said feed trough means and said feed hopper means out of and into the reach of feeding animals, electrical power means operably associated with said cable drum means to rotate it; and electrical timer means operably associated with said electrical power motor means and said powered conveyor means to control the raising and lowering of said feed trough means and hopper means and to control the operation of said powered conveyor means, thereby controlling the feeding times, the feeding duration, and the feed quantity.

4. An animal feeding apparatus comprising: feed trough means; feed hopper means associated with said trough means; conveyor means for said trough means adapted to transport feed from said hopper means to said trough means and distribute the feed in said trough means; electrical motor means for operating said conveyor means; hoist means for raising and lowering said trough means out of the reach of and into the reach of feeding animals; and electrical motor means operatively associated with said hoist means; electrical control means for actuating said conveyor power motor a substantial time ahead of actuation of said hoist electrical motor to distribute feed in said trough before said trough is lowered into the reach of hungry animals; said hoist electrical motor being reversible; and said electrical control means being adapted to actuate said hoist electrical motor in a reverse direction after a set feeding time to raise said trough means out of reach of said animals.

References Cited in the file of this patent

UNITED STATES PATENTS

| | | |
|---|---|---|
| 600,056 | Askew | Mar. 1, 1898 |
| 1,825,524 | Hintz | Sept. 29, 1931 |
| 1,891,042 | Benoit | Dec. 13, 1932 |
| 2,661,800 | Reichenbach | Dec. 8, 1953 |
| 3,029,791 | Hacker | Apr. 17, 1962 |
| 3,033,163 | Hostetler et al. | May 8, 1962 |